Figure 1:
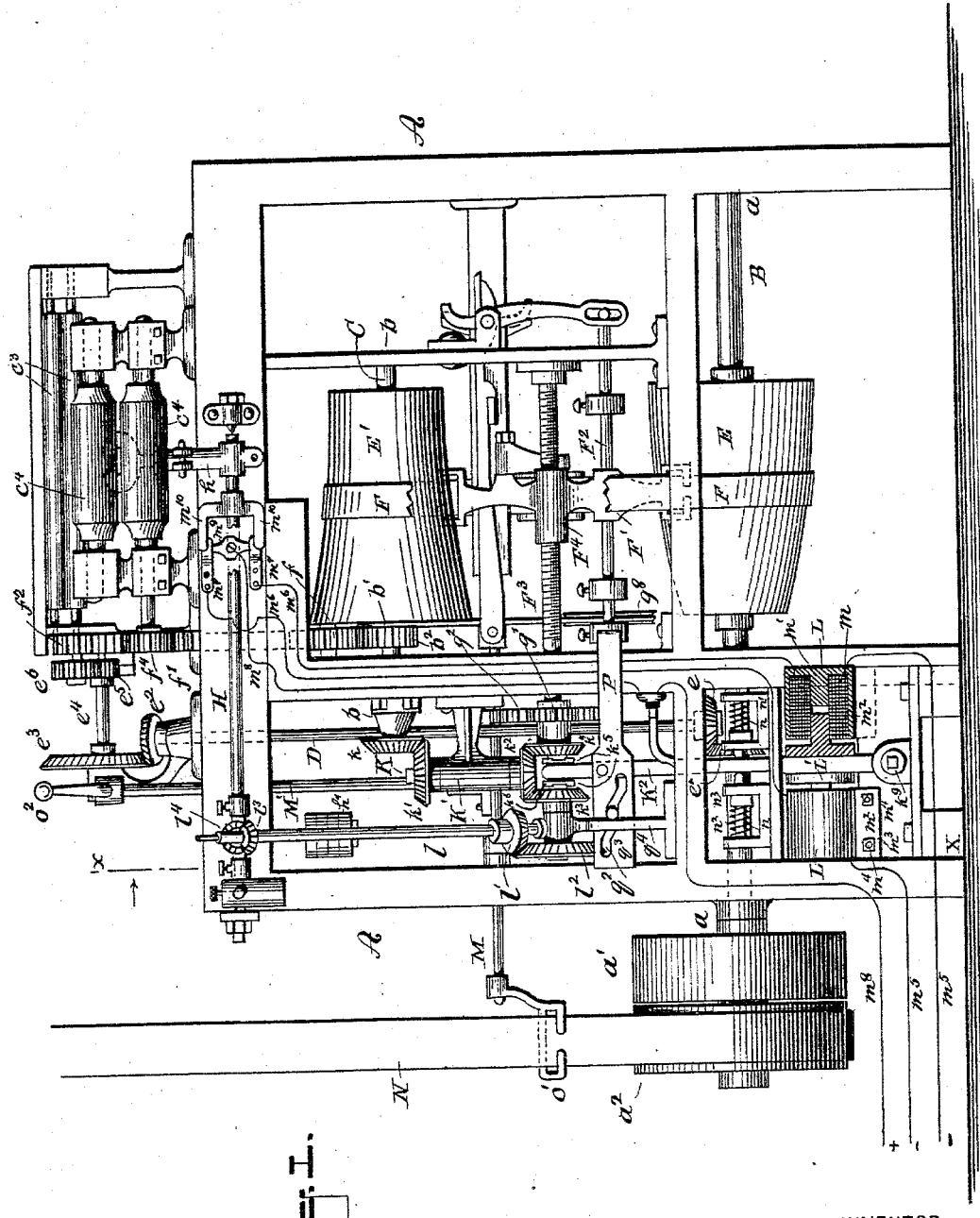

(No Model.)  7 Sheets—Sheet 1.

A. W. MATHEWSON.
RAILWAY HEAD.

No. 565,084.  Patented Aug. 4, 1896.

WITNESSES:
D. D. Mott
S. L. Nippe

INVENTOR
Arthur W. Mathewson,
BY
Wm. H. Appleton,
ATTORNEY.

(No Model.) 7 Sheets—Sheet 2.
A. W. MATHEWSON.
RAILWAY HEAD.
No. 565,084. Patented Aug. 4, 1896.

WITNESSES:
INVENTOR
Arthur W. Mathewson,
BY
ATTORNEY.

(No Model.) 7 Sheets—Sheet 3.

A. W. MATHEWSON.
RAILWAY HEAD.

No. 565,084. Patented Aug. 4, 1896.

WITNESSES:

INVENTOR

Arthur W. Mathewson,
BY
ATTORNEY.

(No Model.) 7 Sheets—Sheet 4.
A. W. MATHEWSON.
RAILWAY HEAD.
No. 565,084. Patented Aug. 4, 1896.
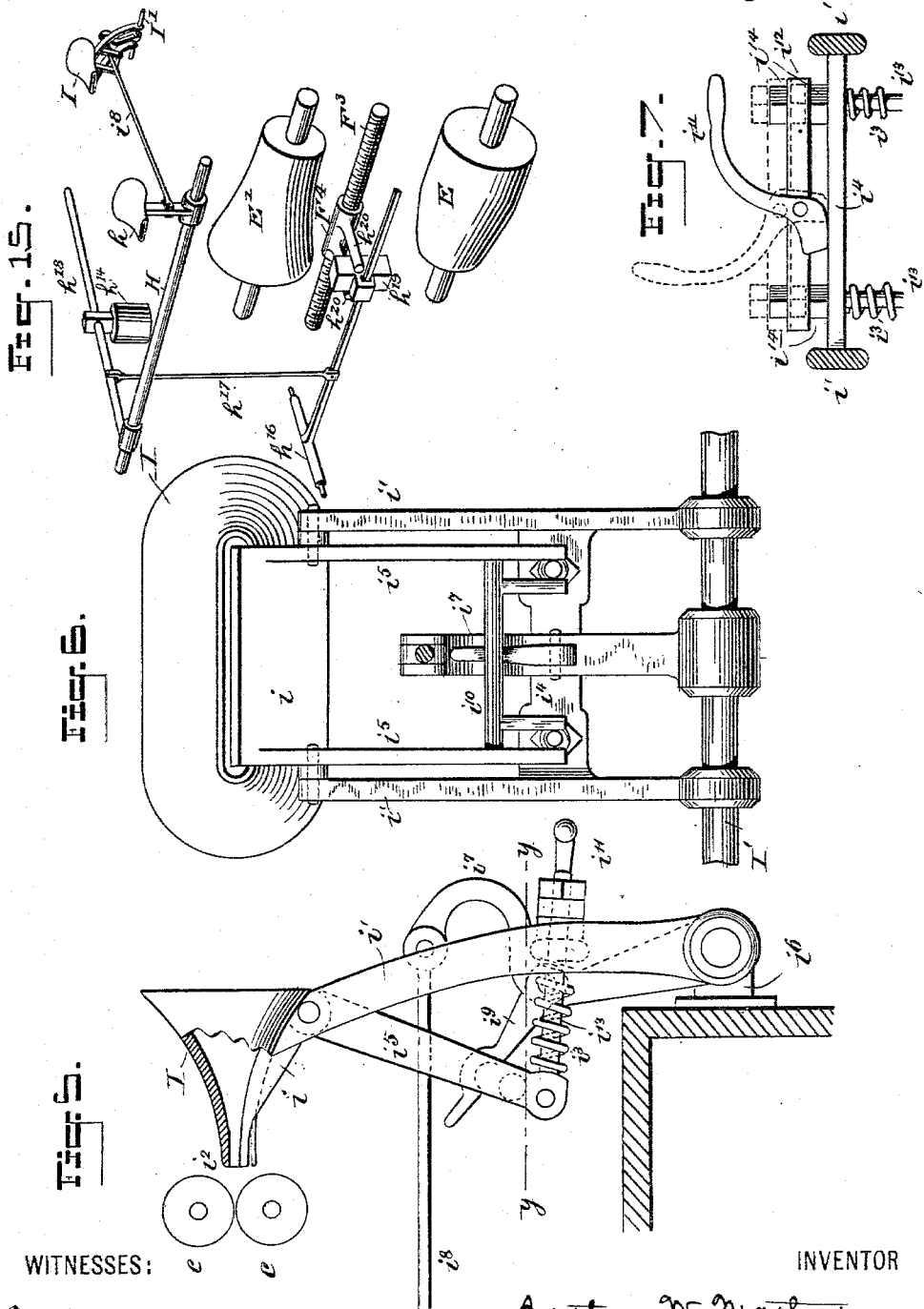
WITNESSES:
INVENTOR
Arthur W. Mathewson,
BY
ATTORNEY.

(No Model.) 7 Sheets—Sheet 5.
A. W. MATHEWSON.
RAILWAY HEAD.

No. 565,084. Patented Aug. 4, 1896.

WITNESSES: INVENTOR
Arthur W. Mathewson
BY
ATTORNEY.

(No Model.) 7 Sheets—Sheet 6.
A. W. MATHEWSON.
RAILWAY HEAD.

No. 565,084. Patented Aug. 4, 1896.

WITNESSES:
A. N. Jesbera
Geo. J. Brennan.

INVENTOR
Arthur W. Mathewson,
BY
Wm. H. Appleton
ATTORNEY.

(No Model.) 7 Sheets—Sheet 7.
A. W. MATHEWSON.
RAILWAY HEAD.

No. 565,084. Patented Aug. 4, 1896.

WITNESSES:
A. N. Jesbera
Geo. J. Brennan

INVENTOR
Arthur W. Mathewson,
BY
Wm. H. Appleton
ATTORNEY.

UNITED STATES PATENT OFFICE.

ARTHUR W. MATHEWSON, OF LEWISTON, MAINE.

RAILWAY-HEAD.

SPECIFICATION forming part of Letters Patent No. 565,084, dated August 4, 1896.

Application filed August 26, 1895. Serial No. 560,521. (No model.)

*To all whom it may concern:*

Be it known that I, ARTHUR W. MATHEWSON, a citizen of the United States, and a resident of Lewiston, county of Androscoggin, and State of Maine, have invented certain new and useful Improvements in Railway-Heads, of which the following is a specification.

In the transformation of cotton fiber into yarn, preparatory to the weaving of the latter into cloth, it is essential that the product resulting from the carding operation should be so evened that it shall be of a uniform size and weight throughout, as any variation or unevenness therein will be propagated throughout the subsequent yarn-making operations and appear in the completed yarn, rendering the same highly objectionable and of an inferior quality. To effect this evening operation and insure the production of yarn of uniform size and weight, the individual products of a series of cards are united and the mass so united passed through a railway-head, where it is drawn down and converted into an untwisted strand, known in the art as a "drawing." The united products of the several cards thus delivered to the railway-head, in consequence of variations in the sizes and weights of the products of the individual cards and of the stopping and starting of one or more of the cards of the series, is not maintained at all times at a uniform size and weight, but varies sometimes within narrow and sometimes within wide limits as one or the other of these causes may be acting. As a result of these variations the drawing delivered by the railway-head would similarly vary if provisions were not made to obviate such defect. To remedy this objection, therefore, the railway-head is usually provided with what is known in the art as an "evener mechanism," which is controlled in its operation by the material passing through the railway-head and serves to so vary the relative movements of the drawing-rolls that when the united products of the series of cards is above or below the standard size and weight it will have imparted to it a correspondingly greater or lesser degree of draft, and the resulting drawing delivered by the railway-head thereby rendered practically uniform in size and weight, no matter how much the united products of the cards may vary in these respects. The devices heretofore in use upon which the material passing through the railway-head has operated to control the movements of this evener mechanism have been of various forms. In most instances these devices have consisted of a trumpet-shaped guide, called in the art a "trumpet," which, connected with the belt-shipping devices of the evener mechanism through appropriate appliances and suitably counterbalanced by a weight or springs, has, in some cases, been located in rear of the drawing-rolls of the railway-head and has received the drawing which has been passed therethrough after leaving them, while in other cases it has been located in front of these rolls, and the united products of the several cards of the series has been passed through it before entering them, the variations in the size and weight of the material passing through it, whether in the form of a drawing or of the united products of the series of cards, causing and allowing it to respectively swing forward or backward on its supporting-axis and through it to bring into operation the belt-shipping devices of the evener mechanism as the friction of the material passing through it is increased or diminished above or below a certain limit by an increase or diminution in the size and weight of such material. In other cases these devices have consisted of a fluted roller arranged in front of the drawing-rolls and of a series of coöperating pivoted plates disposed beneath it, with suitable rods and levers through which these plates are connected with the belt-shipping devices of the evener mechanism, the variations in size and weight of the material passing between the roller and the plates in this arrangement similarly causing the movement of the belt-shipping devices in one or the other direction as the size and weight of the material acted upon are increased or diminished. In still other cases these devices have consisted of a single vertically-movable plate, over which the united products of the several cards of the series has been passed and which, located in front of the drawing-rolls and connected with the belt-shipping devices of the evener mechanism, has likewise, by its elevation and descent, caused the movement of the latter in one or the other direction, as the weight of the material passing over it to such drawing-rolls was below or above the weight required.

The several devices thus specified for bringing the evener mechanism into and carrying it out of operation, as the variation in the drawing or in the united products of the series of cards upon which they respectively operate require, while effective to a certain extent in causing the evening of the resulting drawing in a general way, have been found objectionable in practice principally because of the fact that they are either not sufficiently sensitive to respond to the smaller variations in the material operated upon, or else they do not cause the operation of the evener mechanism upon the material at the proper time. Of those opened to the first of these objections may be instanced the forms in which the fluted roller and the coöperating pivoted plates are arranged in front of the drawing-rolls, and those in which the single vertically-movable plate is arranged in the same relation and operated by variations in the weight alone of the material passing over it. While of those that are open to the last objection there may be noticed those in which the trumpet is arranged in rear of the drawing-rolls and receives the drawing after it has been discharged by them.

With the parts arranged in the position last mentioned the trumpet, as is obvious, is not acted upon by variations in the size and weight of the drawing and the movement of the evener mechanism to correct them thereby initiated until after these variations have passed the drawing-rolls and arrived at or in the trumpet. As a result of this, by the time the variations reach the trumpet and effect or permit of its movement the drawing passing through the drawing-rolls may have returned to the requisite size and weight; but, notwithstanding this fact, the variations acting upon the trumpet will cause or permit of its vibration in one or the other direction, thereby bringing the evener mechanism into operation and causing a change in the relative speeds of the drawing-rolls. The change in the relative speed of the rolls thus effected will of course cause a greater or lesser degree of draft of the material passing between them and a consequent change in the size and weight of the drawing delivered, which, if before of the requisite size and weight, will now be of a lesser or greater size and weight, as the variation at the time acting upon the trumpet is above or below the standard size and weight of the drawing, respectively. The variation in the size and weight thus produced by the evener mechanism arriving at the trumpet will act upon it, causing the evener mechanism to be again operated, the relative speed of the drawing-rolls to be again changed and a still further variation in the size and weight of the drawing effected, which, again operating upon the trumpet, will, through the evener mechanism, cause a still further variation in the size and weight of the drawing produced, and so on, the drawing and the evener mechanism thus acting and reacting upon each other several times to alternately increase and decrease the size and weight of the drawing before it is restored to its required size and weight. To remedy this evil, the trumpet has, in some instances, been provided with counterbalancing devices, which, after the trumpet has been tilted in one or the other directions by an increase or decrease in the size and weight of the material passing through it, and thereby initiated the required movement of the evener mechanism corresponding thereto, have been so adjusted automatically by appropriate means as to compensate for the increased or decreased friction exerted upon the trumpet by such variation, and thereby allowed of the gradual return of such trumpet to its normal position, and the drawing to its requisite size and weight, without the objectionable back-and-forth vibrations of the former, and the consequent alternate increases and decreases in the size and weight of the latter, as theretofore. The devices thus employed, however, while serving in a measure to overcome the objection noted have not in all cases proved reliable, principally because of the indirect way in which they have acted upon the trumpet or other devices or because of their complication. Moreover, in railway-heads as heretofore constructed the belt-shipping devices of the evener mechanism have been provided with but a single means for operating them, which, adapted to respond to the smaller variation in the size and weight of the material passing through the railway-head, has been too slow in its movement to respond with the requisite speed to the larger variations, and hence, as a result thereof, when these larger variations have occurred a large amount of defective drawing has been produced before the evener mechanism was able to restore such drawing to its normal and requisite size and weight.

To overcome the objections above pointed out and produce a railway-head which shall not only be more efficient in operation than those heretofore in use, but one in which the evener mechanism shall respond to large and small variations in the size and weight of the material operated upon with approximately equal rapidity is the object of my invention.

To these ends the invention consists, first, in the employment, in connection with the drawing and calender rolls, a trumpet arranged in rear of the drawing-rolls, and an evener mechanism, of a second trumpet disposed in front of such drawing-rolls, whereby the evener mechanism may be operated upon by the material passing through the railway-head to even the same, not only after it has passed the drawing-rolls, but before it enters the same; second, in the means whereby the shipping devices of the evener mechanism are operated at one speed to cause the evening of the material passing through the railway-head when the variations therein are of the smaller sizes and weights, and at another speed when such variations are of the larger sizes and weights; third, in the peculiarities of construction of the trumpet placed in front of the drawing-rolls; fourth, in the means employed to counterbalance the trumpets and compensate for the variations in the friction of the materials passing through them, due to an enlargement or reduction in the size and weight of such materials, and, fifth, in various other peculiarities of construction and combinations of parts, all as will hereinafter more fully appear.

Figure 2:
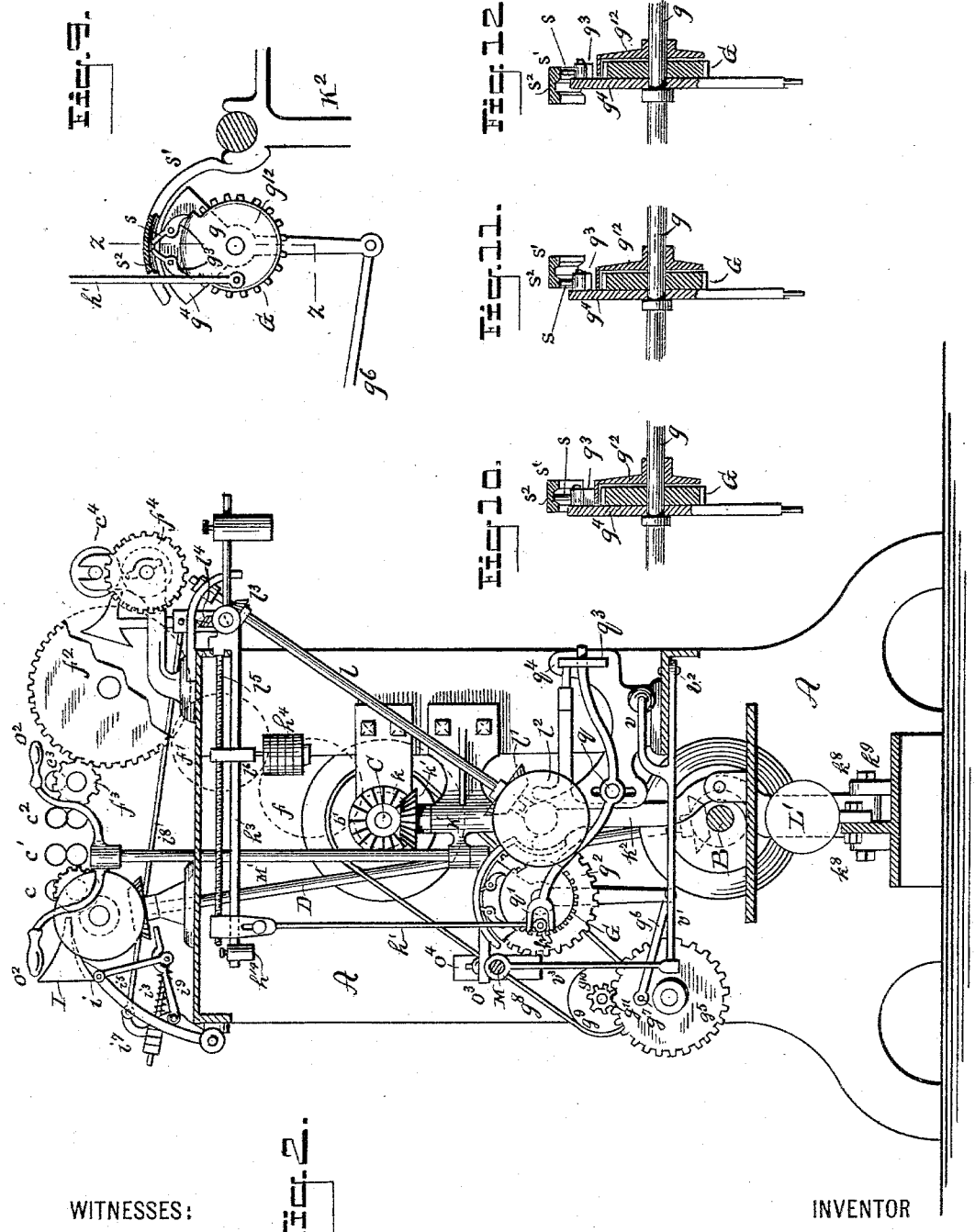
Figure 3:
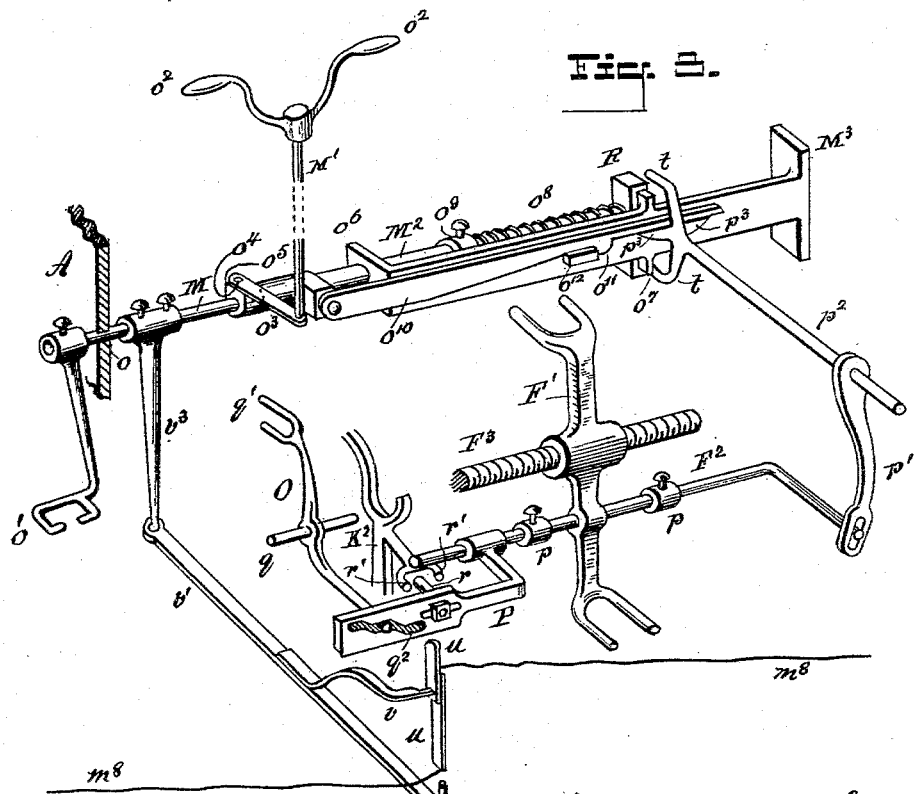
Figure 4:
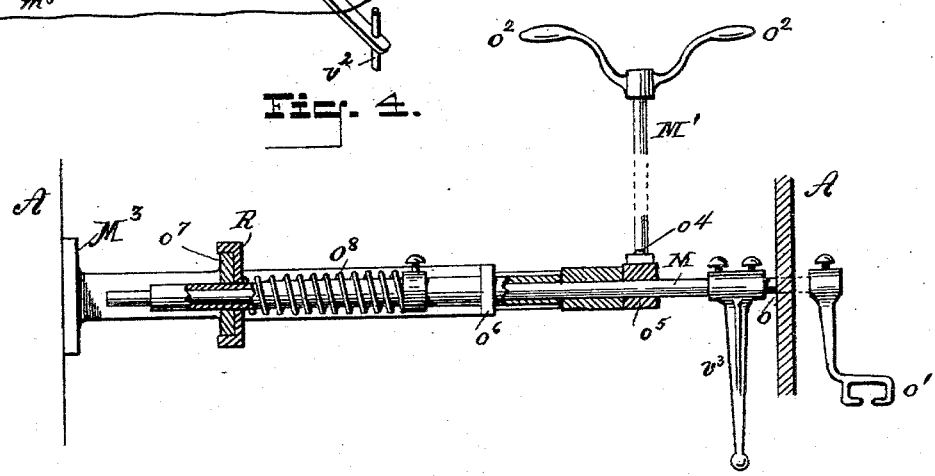
Figure 8:
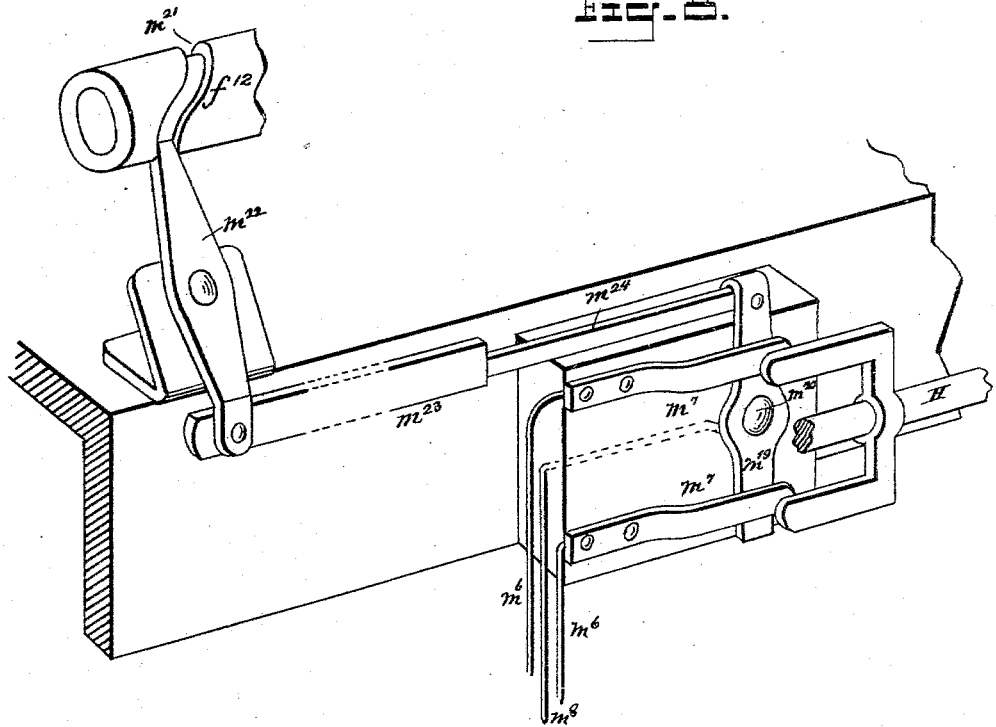
Figure 13:
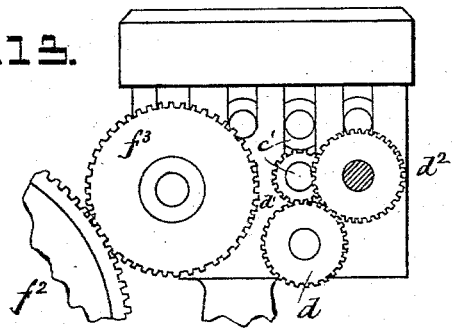
Figure 14:
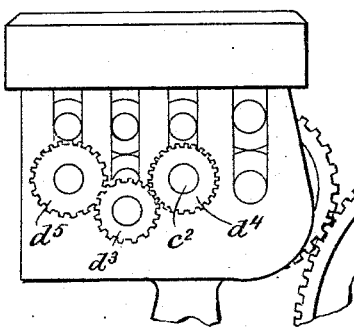
Figure 16:
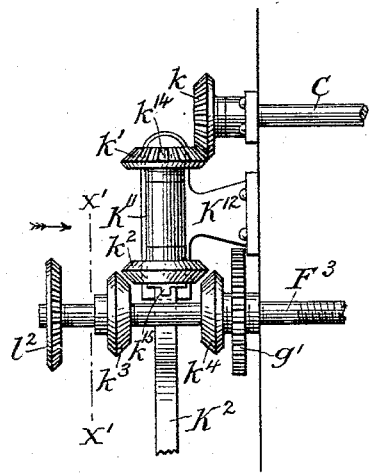
Figure 17:
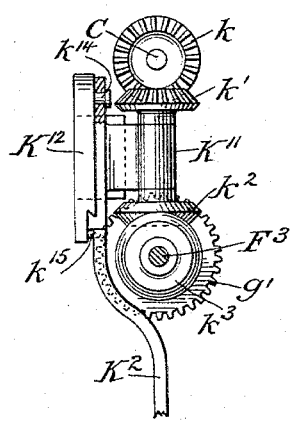

Referring to the accompanying drawings, which form a part of this specification, Figure 1 is a front elevation of certain of the parts of a railway-head constructed in accordance with my invention, the evener-belt being broken away and one of the electromagnets being shown in section; Fig. 2, a sectional side elevation thereof, taken in the plane $xx$ of Fig. 1, certain of the parts being broken away; Fig. 3, an isometrical projection of certain of the parts connected with the belt shipping and stopping mechanism detached, showing also the means for making and breaking the electric circuit leading to the railway-head as the shipper is moved in one direction to start and in the other direction to stop such head, respectively; Fig. 4, a side elevation of a portion of the shipping mechanism detached, certain of the parts being shown in section; Fig. 5, a side elevation of the front trumpet, showing also the rear pair of drawing-rolls and a portion of the framing of the railway-head, a part of the trumpet being broken away; Fig. 6, a rear elevation of the front trumpet detached; Fig. 7, a horizontal transverse section of the front trumpet, taken in the plane $yy$ of Fig. 5, and showing the means whereby the smaller end of the trumpet may be opened or enlarged; Fig. 8, a detail showing a slightly-modified construction of parts for making and breaking from the rock-shaft of the rear trumpet the electric circuits leading to the electromagnets; Fig. 9, a side elevation of the pawls, ratchet, pawl-carrier, and shield by which the shipper-operating screw of the evener mechanism is rotated in one or the other direction and its movements controlled, showing also a pawl-lifter for automatically removing the pawls from action when the devices for rotating such screw at a higher speed is brought into action, partially broken away; Fig. 10, a vertical section of such parts, taken in the plane $zz$ of Fig. 9, showing the relation of the pawl-lifter with respect to the pawls when such pawls are in operation; Figs. 11 and 12, similar vertical sections of the same parts, taken in the same plane and showing the relation of the pawl-lifter with respect to the pawls when such pawls are removed from action, the former showing the lifter moved to the right and the latter figure showing it moved to the left of its normal position; Figs. 13 and 14, opposite end views, respectively, of the drawing-rolls, showing also the arrangement of the gearing whereby such rolls may be operatively connected, with portions of their supporting-stands; Fig. 15, a detail showing a modified form of the counterbalancing devices for the front trumpet. Fig. 16 is a detail side elevation of a modified arrangement of parts for rotating the shipper-operating screw in one or the other direction from the shaft C, as the exigencies of the machine may require; Fig. 17, a sectional elevation of such parts, taken in the plane $x'x'$ in Fig. 16 and looking in the direction of the arrow in such last-mentioned figure; and Fig. 18, an isometric projection of a further modification of the counterbalancing devices for the front trumpet, showing also certain of the parts composing the evener mechanism.

In all the figures like letters of reference are employed to designate corresponding parts.

A indicates the frame or housing of the railway-head, and B the main driving-shaft, which is mounted in suitable bearings $a$ thereon, and is provided with a fast and a loose pulley $a'$ and $a^2$.

C indicates a second shaft which is mounted in bearings $b$, above and in parallel relation to the shaft B, and is provided near one of its ends with a band-pulley $b'$ and a spur-gear $b^2$.

$c$, $c'$, $c^2$, and $c^3$ indicate the drawing-rolls, and $c^4$ indicates the calender-rolls. There may be as many pairs of these drawing-rolls as desired. In the form of the invention selected by me for illustration I have shown four of such pairs, of which the three rear pairs $c$ $c'$ $c^2$ are operatively connected and caused to rotate at constant and uniform speeds from the shaft B, while the front pair $c^3$, with the calender-rolls $c^4$, is rotated at a variable speed to even the drawing and render it of a uniform size and weight throughout from the shaft C.

For operatively connecting the rear pairs of drawing-rolls $c$ $c'$ $c^2$, whereby to insure of their proper relative rotation with respect to one another, various arrangements of gearing may be employed. I prefer, however, to connect the under roll of the pair $c'$ with the under roll of the pair $c$ through the intermediary of a gear $d$, which intermeshes with both a gear $d'$ on the former roll and with a gear $d^2$ on the latter roll, and to similarly connect the under roll of the pair $c^2$ to the same roll of the pair $c$ through the instrumentality of a gear $d^3$, which likewise intermeshes with a gear $d^4$ and a gear $d^5$, with which these last-mentioned rolls are respectively provided; while to impart the necessary rotation to this group of rolls from the shaft B, I find it convenient to employ the shaft D, which, provided with a bevel-gear $e$ on its lower end that intermeshes with a similar bevel-gear $e'$ on the shaft B, is likewise equipped at its upper end with a second bevel-gear $e^2$, which similarly intermeshes with a corresponding bevel-gear $e^3$, fixedly attached to the end of a short horizontal shaft $e^4$, and communicates its rotation to the under roll of the pair $c$ through such short shaft $e^4$ and the spur-gears $e^5$ and $e^6$.

For imparting the necessary rotation to the front pair of drawing-rolls $c^3$ and to the calender-rolls $c^4$, on the other hand, I find it convenient to employ the train of gears $f$, $f'$, and $f^2$, the first of which, $f$, intermeshes with the gear $b^2$ on the shaft C, and the last of which, $f^2$, intermeshes with both the gears $f^3$ and $f^4$ with which the under roll of the pair of drawing-rolls $c^3$ and the under roll of the calender-rolls $c^4$ are respectively provided. By thus operating the rear drawing-rolls from one shaft and the front drawing-rolls and the calender-rolls from another provisions are made for varying the relative speed of both the front drawing-rolls and the calender-rolls with respect to the speed of the rear drawing-rolls, whereby to increase or decrease the amount of draft imparted to the material passing through the railway-head as such material in its delivery to them is above or below the requisite size and weight.

The means made use of for thus varying the relative speed of the front drawing-rolls and the calender-rolls with respect to the speed of the back drawing-rolls in my preferred form of construction consists of the oppositely-arranged cones E and E', which are respectively secured to the shafts B and C, and the latter rotated from the former through the intervention of the belt F, which is movable back and forth along such cones, as the changes in the size and weight of the material passing through the railway-head may require, by a shipper F', which is mounted to slide on a supporting and guiding rod F² and moved back and forth thereon, as the exigencies of the operation of the head may demand, by a screw F³, engaging with a nut F⁴, with which such shipper is provided. By this arrangement, as will be seen, the relative speed of the shaft C with respect to the shaft B, and hence the relative speed of the front drawing-rolls and the calender-rolls driven therefrom, with respect to the speed of the rear drawing-rolls, may be changed by moving the belt F along the cones, which may be effected by simply turning the shipper-operating screw F³ in one or the other direction, the movement of the belt from the smaller end of the cone E toward its larger end increasing the speed of rotation of the upper cone E', and through it the speed of the front drawing and calender rolls, and the movement of the belt in the opposite direction or from the larger end of this cone toward the smaller end thereof in like manner serving to decrease them.

To effect the rotation of the shipper-operating screw F³ in one or the other direction, as the exigencies of the railway-head may require the movement of the belt F toward or from the smaller end of the cone E, various means may be adopted. In my preferred form of construction, however, I make use of the ratchet G, which, mounted on the end of a short horizontal shaft $g$, is connected with a gear $g'$ on such screw through the intermediary of a gear $g^2$, and is engaged at the proper times by oppositely-arranged pawls $g^3$ $g^3$, pivotally mounted on a carrier $g^4$, which is supported upon the horizontal shaft $g$, and oscillated thereon from the gear $g^5$ through a pitman $g^6$ and pin $g^7$, the said gear $g^5$ being rotated from the pulley $b'$ on the cone-shaft C through the intervention of a belt $g^8$, pulley $g^9$, shaft $g^{10}$, and gear $g^{11}$, with which latter gear it intermeshes. (See Figs. 1, 2, and 9.) The pawls $g^3$ $g^3$ thus carried by the oscillating carrier $g^4$, being supported over the ratchet G, would, as is obvious, engage with the teeth thereof and rotate it in one or the other direction at each oscillation of the carrier if provisions were not made to prevent it. In order therefore to obviate this and permit the engagement of these pawls therewith at such times only as the rotation of the shipper-operating screw is required, I employ the shield $g^{12}$, which is preferably mounted upon the shaft $g$ beside the ratchet G, and extending inward over the teeth of the ratchet beneath the pawls prevents the latter from engaging with the former at all times when interposed between them, as shown more clearly in Figs. 2, 9, and 10. In some cases this shield $g^{12}$ may extend entirely around the ratchet, in which event it will be provided at the proper places with suitable openings or orifices through which, when brought into proper position, the pawls may drop and engage with the teeth of the ratchet to rotate it. I prefer, however, to make it of a length substantially equal to or a little longer than the distance from the extreme limit of the forward movement of one of the pawls to the extreme limit of the forward movement of the other pawl. As thus constructed, when the shipper-operating screw is to remain stationary the pawls, as they are reciprocated back and forth over the ratchet by the oscillation of their carrier $g^4$, will rest upon the flange, which will then be held in a position to extend beneath them, and their engagement with the teeth of such ratchet will be thereby prevented. When, on the other hand, the rotation of the screw is required to move the belt along the cones in one or the other direction, the shield will be moved around over the ratchet until it has been withdrawn from under the pawl that is to be brought into action to rotate the screw in the required direction, when such pawl will fall into engagement with the teeth of the ratchet and rotate it, with the screw, in that direction at every forward impulse given to it by its carrier. The rotation thus given to the ratchet and screw will continue until in the operation of the railway-head it is required that the movement of the belt F along the cones E and E' should be arrested, when the shield $g^{12}$ will be carried around over the ratchet in a reverse direction, raising the pawl from engagement with the teeth thereof, and thereby bringing such ratchet and screw to a state of rest. The bringing of one or the other of these pawls $g^3$ into operation, as the rotation of the shipper-operating screw in one or the other direction is required, and the carrying of it out of action when its operation is not demanded, being thus effected by the movement of the shield in one or the other direction around the ratchet, it is obvious that the movements of the belt F along the cones E E' and the consequent changes in the relative speeds of the front drawing-rolls and of the calender-rolls with respect to the speed of the rear drawing-rolls, to correct variations in the size and weight of the material passing through the railway-head, may be effected and a drawing of uniform size and weight produced by simply controlling the movements of this shield as the exigencies of these variations may require. These movements may be controlled in various ways. I prefer, however, to control them by the material passing through the railway-head, and to this end I find it convenient to connect the shield with the shaft H upon which the trumpet $h$ is fixedly secured. The means whereby this connection is effected consists of the pitman $h'$, which is jointed at its lower end to the shield by a pin $h^2$ and is hinged at its upper end to the free end of an arm $h^3$, fixedly secured to the said shaft and extending under the table of the railway-head, as shown. By this arrangement, as will be seen, any tilting of the trumpet toward or away from the calender-rolls $c^4$ will be communicated through the shaft H, arm $h^3$, and pitman $h'$ to the shield, and the particular pawl $g^3$, answering to such movement, thereby brought into or carried out of engagement with the ratchet G as the requirements of such movement demands. In order therefore to cause the proper tilting movement of this trumpet toward and away from the calender-rolls by variations in the size and weight of the material passing through it, and hence the evening of such variation, I provide the counterbalancing-weight $h^4$, which is supported upon the arm $h^3$, and which, serving to hold the trumpet in its normal position when the material passing through the latter is of the proper size and weight, permits of its tilting forward toward the calender-rolls, by the increased friction therein, when the size and weight of the material are increased, and causes it to tilt backward in an opposite direction away from the rolls when the size and weight of such material, and the consequent friction due to its passage therethrough, are decreased. As a result of this and of the connection of the trumpet with the shield when the trumpet is held in its normal position by the counterbalancing-weight—as is the case, for instance, when the material passing through it is of the proper size and weight—the shield will be similarly held by such trumpet in a central position with respect to the pawls, and neither of them thereby allowed to engage with the ratchet G, which, with the shipper-operating screw, will remain stationary. When, on the other hand, the trumpet is tilted from this position, either toward or away from the calender-rolls, by an increase or decrease in the size and weight of the material passing through it, then, by such movement, the shield will be moved around the ratchet in one or the other direction, the appropriate pawl brought into engagement with the ratchet, and the shipper-operating screw thereby rotated in the proper direction to move the belt F along the cones to the required position to so change the relative speed of the front drawing-rolls and the calender-rolls with respect to the speed of the rear drawing-rolls as to impart to the material passing between them the necessary draft to restore it to the requisite size and weight. The size and weight of the material having been thus restored, the trumpet will be returned to its normal position, carrying with it the shield, the effect of which will be to withdraw the pawl from engagement with the teeth of the ratchet, and thereby interrupt the rotation of the shipper-operating screw and the further movement of the belt along the cones. In these positions the parts will remain until a further variation in the size and weight of the material passing through the railway-head occurs, when a further tilting movement of the trumpet will be caused and the movement of parts above specified repeated, and so on, the variations in the size and weight of the material passing through the railway-head, by their operation upon the trumpet, controlling the movements of the shield $g^{12}$, and through it the movements of the parts whereby such variations are obviated.

The trumpet $h$ being arranged in rear of the drawing-rolls $c\ c'\ c^2\ c^3$ will not be acted upon by any variation in the size and weight of the material passing through the railway-head, as is manifest, until after such variation has passed the drawing-rolls, and hence has passed the point where it can be remedied. To obviate this, I locate devices in front of the drawing-rolls, upon which variations in the size and weight of the material passing through the railway-head may act, to set in operation the evener mechanism to correct the latter before they enter such rolls; and the employment of these devices in connection with the rear trumpet $h$ constitutes one of the important features of my invention. In the construction of these devices any of the well-known forms heretofore in use in this location may be employed. I prefer, however, to construct them in the form of a trumpet I, and to provide it with a movable under jaw $i$, which is pivoted between the supporting-arms $i'$ $i'$ thereof, and its inner end normally held pressed upward toward the upper jaw $i^2$ by spiral springs $i^3$ $i^3$, acting at one of their ends against a girth $i^4$, extending across one of the supporting-arms $i'$ to the other, and at their other ends against the lower ends of arms $i^5$ $i^5$, depending from the under jaw $i$. As thus constructed the trumpet is loosely mounted upon the shaft $I'$, which in turn is fitted to turn loosely in bearings $i^6$ $i^6$, secured to the rear edge of the railway-head table, as shown. In some cases this trumpet may be connected directly with the shield $g^{12}$ and control its movements independently of the trumpet $h$. I prefer, however, to connect it with the trumpet $h$ and to impart its controlling action to such shield therethrough. For effecting this connection of the front with the rear trumpet I make use of the arm $i^7$, which, fixedly secured to the shaft $I'$, is jointed at its upper end to the trumpet $h$ by a rod $i^8$, and is provided with a pivoted latch $i^9$ for engagement with a rod $i^{10}$, extending from one of the depending arms $i^5$ across to the other. By this arrangement the two trumpets may be so united as to move in unison, or the front trumpet disconnected from the rear trumpet and made independently movable, by simply engaging or disengaging the latch $i^9$ with or from the rod $i^{10}$, as the case may be. When the front trumpet is disconnected from the rear trumpet, it may be turned back away from the drawing-rolls, as is sometimes necessary to permit of the passage therethrough of the end of the united products coming from the cards when broken, to "piece up" or "mend," as it is called, the "broken end," and in order to facilitate the passage of such broken end through it I find it convenient to provide this trumpet I with means whereby the inner end of the under jaw $i$ may be drawn down from the upper jaw $i^2$ and the opening through the trumpet thereby enlarged at its smaller end. These means, in my preferred form of construction, consist of a cam-lever $i^{11}$, which is pivoted in a bar $i^{12}$, that is disposed in rear of the girth $i^4$ and connected with the lower ends of the arms $i^5 i^5$, depending from the under jaw $i$, by rods $i^{13}$ $i^{13}$, which extend axially through and forms supports for the spiral springs $i^3$ $i^3$. As thus provided, the depression of the under jaw $i$, and the consequent enlargement of the opening through the trumpet at its smaller end, may be effected by simply turning the cam-lever $i^{11}$ into the position shown by dotted lines in Fig. 7, and its subsequent return to its original position, and the concomitant reduction of the opening through the trumpet, similarly accomplished by turning the cam-lever in the opposite direction or into the position shown by full lines in said figure.

With the parts employed for depressing and elevating the under jaw $i$, and thereby effecting the respective enlargement and contraction of the opening through the trumpet I, I sometimes find it convenient to employ the nuts $i^{14}$ $i^{14}$, which, arranged upon the rods $i^{13}$ $i^{13}$ in rear of the girth $i^4$, permit of the adjustment of the smaller end of such opening to suit the trumpet to the passage of materials of different sizes and weights therethrough when desired. By thus arranging devices for controlling the movements of the evener mechanism in front, as well as in rear, of the drawing-rolls, upon which variations in the size and weight of the material passing through the railway-head may act, not only is such evener mechanism brought into operation to effect the necessary evening action upon the material by variations appearing in the latter after it has passed the drawing-rolls, but it is also brought into operation to effect that action by variations appearing in the same before it enters those rolls, the result of which is the production of a drawing that is more uniform in size and weight than has heretofore been possible, if the tendency of the said devices to return to their normal positions, after having been deflected therefrom, either by an increase or decrease in the friction or weight thereon, is made equal to the deflecting force. With the rear trumpet $h$ this equalization is effected by changing the speed of rotation of the front drawing-rolls with respect to the speed of rotation of the rear drawing-rolls, by the evener mechanism, whereby the material delivered by them is increased or decreased in size and weight to restore it to its normal condition, as the deflecting force acting upon the trumpet is in a direction away from or toward the calender-rolls, respectively, the counterbalancing-weight $h^{14}$, which is or may be fixedly secured to the arm $h^3$ as a constant, serving, as is well understood, as the deflecting force in the one case, and the increase in the friction, due to the enlarged material passing through the trumpet, serving as a similar deflecting force in the other. With the front trumpet I, on the other hand, this equalization cannot be effected by thus changing the amount of draft imparted to the material passing through the railway-head, since, being located in front of the drawing-rolls, the trumpet is acted upon by the material before it enters them, and hence before they have had an opportunity to operate upon it. As a result of this, if any variation in the size and weight of the material passing through it has caused a sufficient deflection thereof to set into operation the evener mechanism to correct it in the resulting drawing, and is continued, as would be the case, for instance, where the product of one of the cards of the series has been added or withdrawn, the deflection of such trumpet would be likewise continued and the evener mechanism maintained in operation to reduce or increase the size and weight of the drawing indefinitely, as the variation in the size and weight of the material acting upon it was above or below the standard size and weight, respectively. To effect such equalization, therefore, without interfering with the evening of these variations by the evener mechanism, I preferably employ counterbalancing devices in connection with the trumpet, which are so adjustable from the operative parts of the railway-head that when the material passing through the trumpet is increased or decreased in size and weight, and its deflective force upon it thereby correspondingly increased or diminished, these counterbalancing devices will be so adjusted with respect thereto as to overcome and balance such increased or decreased force, as the case may be, and return the trumpet to its normal position, leaving whatever variations there may be entailed upon the resulting drawing to be thereafter remedied by the evener mechanism through the intervention of the rear trumpet $h$. For effecting this counterbalancing operation I sometimes find it convenient to employ the lever $h^{16}$, which, pivoted to the housings of the railway-head, and connected by a connecting-rod $h^{17}$ to an arm $h^{18}$, projecting from the shaft H, receives a weight $h^{19}$, that is movable back and forth thereon, to accomplish the necessary counterbalancing operation, from the nut $F^4$, through the lugs $h^{20}$, projecting therefrom and engaging with the opposite sides of the weight, as shown in Fig. 15. The devices I have found the most convenient in practice for accomplishing this operation, however, are shown in Figs. 1 and 2, and consist of a weight $h^4$, which, loosely supported on the arm $h^3$ on the front-trumpet shaft H, is movable back and forth along such arm from the shipper-operating screw $F^3$, through the intermediary of a shaft $l$, which, provided with a bevel-gear $l'$ on its lower end that engages with a corresponding bevel-gear $l^2$ on the shipper-operating screw $F^3$, is likewise equipped with a second bevel-gear $l^3$ at its upper end, which similarly engages with a bevel-gear $l^4$, secured to the end of a screw-shaft $l^5$, mounted in suitable bearings on said arm $h^3$, and engaging with a threaded orifice in a support $l^6$, upon which the weight $h^4$ is mounted. As thus arranged, whenever either the front or rear trumpet is deflected from its normal position toward or away from its respective drawing or calender rolls by an increase or decrease in the friction of the material passing through it, the weight $h^4$ will be so moved along the arm $h^3$ from the shipper-operating screw $F^3$, through the screw-shaft $l^5$ and intermediate connections, as to increase or decrease its counterbalancing action upon the trumpet I, and thereby bring it into equilibrium with such increase or decrease of friction, and through it restore the trumpet to its normal position, after having so changed, through the evener mechanism, the relative speed of rotation of the front drawing-rolls with respect to the speed of rotation of the rear drawing-rolls so as to return the drawing delivered by the railway-head to its standard size and weight.

Figure 18:
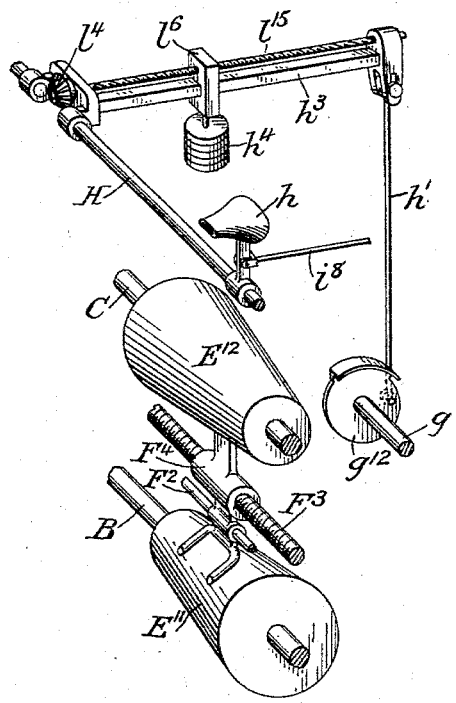

If the increase and decrease in the friction of the material passing through the trumpet, due to increments and decrements in the size and weight thereof, were directly proportional to such increments and decrements, or if the movement of the weight $h^4$ thereby along the arm $h^3$ maintained a similar proportion to the movement of the belt F along the cones to correct it, both the pitch of the thread of the screw-shaft $l^5$ and the taper of the cones E E' might be uniform throughout. I have found in practice, however, that this increase and decrease in the friction bears no proportion to the increments and decrements in the size and weight of the material, and that the same is true respecting the movements of the weight $h^4$ along the arm $h^3$ and the movement of the belt F along the cones. As a consequence of this, when both the screw-shaft $l^5$ is provided with a uniform pitch of thread throughout and the cones E E' are provided with surfaces that are of a uniform taper, the movement of the trumpets back to their normal positions after having been deflected therefrom is not wholly accomplished and the defect that was sought to be remedied by such deflection more or less continued. To obviate this and to insure the return of the trumpet to its normal position after it had been deflected therefrom and the drawing has been restored to its standard size and weight, I sometimes find it convenient to construct the thread on the screw-shaft $l^{15}$, that moves the weight $h^4$ along the arm $h^3$, with a gradually-increasing pitch from its middle point toward each of its ends, as shown in Fig. 18, whereby, while the travel of the belt F along the cones $E^{11} E^{12}$, to change the relative speed of rotation of the front drawing-rolls with respect to the speed of rotation of the rear drawing-rolls, will be a constant, the travel of the weight $h^4$ out and back along the arm $h^3$, by the action thereon of the thread on the screw-shaft $l^{15}$, and hence the counterbalancing action of the weight on the trumpet, will be an increasing and decreasing variable, as it moves in one or the other directions, and that as a consequence thereof, when the belt has traveled along the cones to the proper position to impart to the front drawing-rolls the proper relative speed of rotation with respect to the speed of rotation of the back drawing-rolls, to insure the requisite draft to produce the drawing of the standard size and weight, the weight $h^4$, by its gradually increasing or decreasing travel, will have reached a point on the arm $h^4$ where the gradually increasing or decreasing friction, as the case may be, in the trumpet will be just balanced thereby. I prefer, however, to make use of a screw-shaft $l^5$, which is provided with a thread that is of uniform pitch throughout, as in Fig. 2, and to impart a gradually increasing or decreasing change in the relative speed of rotation of the front drawing-rolls with respect to the speed of rotation of the back drawing-rolls, as the variation in material delivered to the railway-head is above or below the standard size, by cones E E', which instead of having uniform tapers from end to end, shall have variable tapers that describe curved lines, as shown more particularly in Fig. 1. By this arrangement, as will be seen, the relative travel of the weight $h^4$ along the arm $h^3$, with respect to the travel of the belt F along the cones, will be at all times uniform, but, in consequence of the variation in the taper of such cones, by the time the weight has traveled along the arm $h^3$ to a point where it will afford the necessary counterbalance to the trumpet, when deflected from its normal position, the necessary changes in the relative speed of rotation of the front drawing-rolls with respect to the speed of rotation of the rear drawing-rolls will have been accomplished, and the drawing delivered thereby will be of the standard size and weight.

With the construction of parts as thus far described the rotation of the shipper-operating screw $F^3$ in one or the other direction, for the purpose of correcting variations in the size and weight of the material passing through the railway-head, has been effected wholly by the pawls $g^3$ $g^3$ engaging with the ratchet G. This arrangement, while efficient in the correction of the smaller variations in the size and weight of the material, has been found in practice to work too slowly where the larger variations are involved. I have accordingly provided a second means for rotating this screw, which is brought into operation when these larger variations occur, and which, when so brought into operation, impart to such screw a rotation at a greatly-increased speed. The means made use of for imparting this increased speed of rotation to the shipper-operating shaft, when such increase of speed is required, may be of various forms. In the embodiment of the invention selected by me for illustration, however, it consists of a shaft K, which is continuously rotated from the upper cone-shaft C, through the intervention of the bevel-geas $k$ $k'$, and is provided at its lower end with a bevel-gear $k^2$ for coöperating with the oppositely-arranged bevel-gears $k^3$ and $k^4$, mounted upon the shipper-operating screw $F^3$. In some instances these gears $k^3$ and $k^4$ are fixedly secured upon the shipper-operating screw, and the gear $k^2$ is brought into engagement with one or the other of them, as the rotation of such screw in one or the other direction is required, the gears $k^2$, $k^3$, and $k^4$ in these cases being either provided with teeth or constructed in the form of what is known in the art as "friction-gears," as may be desired. When thus arranged, I find it convenient to mount the shaft K in a bracket $K^{11}$, which is pivoted at its upper end by a pivot $k^{14}$ to a stand $K^{12}$, secured to the main framing of the machine, whereby to allow of a pendulous movement to said shaft and permit of the gear $k^2$ being brought into engagement with one or the other of the gears $k^3$ or $k^4$, as required. I prefer, however, to mount the gears $k^3$ and $k^4$ loosely upon the shipper-operating screw, and to bring them separately into engagement therewith, as the necessities for the rotation of the screw requires, by a clutch mechanism, in which arrangement the shaft K is mounted in a suitable bearing K', secured to the main housings of the railway-head, and the gear $k^2$ is maintained in constant engagement with both of the gears $k^3$ and $k^4$, whereby to impart to them a continuous rotation. To provide for clutching these gears $k^3$ and $k^4$ to the shipper-operating screw when required, they are each constructed with a clutch member on its inner face, with which a corresponding clutch member $k^5$, formed on each of the ends of a longitudinally-movable sleeve $k^6$, splined to the shipper-operating screw $F^3$ in a well-known manner, may be brought into engagement as the rotation of such screw from one or the other of these gears may be demanded.

For moving the sleeve back and forth along the shipper-operating screw $F^3$ to bring the appropriate clutch member thereon into engagement with its respective clutch member on the gears $k^3$ or $k^4$, when such sleeve and clutch members are employed, or for swinging the shaft K on its pivot $K^{14}$ to bring the gear $k^2$ on its lower end into engagement with the appropriate gear $k^3$ or $k^4$, when the arrangement of parts shown in Figs. 16 and 17 are employed, I find it convenient to make use of a lever $K^2$, which is forked at its upper end to engage either with a circumferential groove formed in the sleeve $k^6$ or with the lower end $k^{15}$ of the bracket $K^{11}$ and is pivoted at its lower end between ears $k^8$ by a pivot $k^9$. By this arrangement the proper movement of either this sleeve to cause the clutching of one or the other of the gears $k^3$ $k^4$ to the shipper-operating screw or of the shaft K to bring the gear $k^2$ into engagement with either the gear $k^3$ or $k^4$, as required, is accomplished by simply vibrating the lever $K^2$ on its pivot in the required direction. The means whereby this vibration of the lever is effected may be of various forms. I prefer, however, to make use of the two electromagnets L L for the purpose and to arrange them on opposite sides thereof, with their coöperating armature L' secured to said lever, and to bring one or the other of these magnets into an electric circuit, as the movement of the lever in one or the other direction may require, by suitable closing contact-pieces $m^7$ $m^7$, under the control of the trumpets $h$ and I. In the construction of these electromagnets any of the well-known forms may be adopted. The form selected by me for illustration, however, is that of a solenoid and consists of a helix or coil $m$, which is provided with a central core $m'$, extending partially through its center, and with an enveloping-case $m^2$, to which this core $m'$ is secured, and which, surrounding the outer periphery of the helix or core $m$ and extending over its rear end, is provided with a depending flange $m^3$, through which it is secured in place by the bolts $m^4$. As thus constructed the coil of each of these magnets is connected with one of the poles of the dynamo or other source of electric energy (not shown) at one of its ends by a wire $m^5$, and from its other end leads a wire $m^6$, which extends to and is connected with one of the contact-pieces $m^7$, while from the opposite pole of the dynamo or other source of electric energy leads another wire $m^8$, which extends to and connects with the metal block $m^9$. The contact-pieces $m^7$, being made of brass or other resilient material which is a good conductor of electricity, are normally held away from the block $m^9$, so as not to be in contact with it, and hence the electric circuits in which the electromagnets are arranged are normally broken at this point. To complete either one or the other of these circuits, all that is necessary is simply to depress the contact-piece $m^7$ of that particular circuit until it is brought into contact with the block $m^9$, when the circuit will be established, the particular electromagnet in that circuit energized and brought into action, the armature L' attracted thereby, and the gears $k^3$ or $k^4$ corresponding to that magnet brought into operation to actuate the shipper-operating screw $F^2$ therefrom through the lever $K^2$, to which such armature is secured. In this position the parts will remain until the contact-piece $m^7$ is allowed to retire from contact with the block $m^9$, when the electric circuit will be broken and such parts allowed to return to their normal positions. The contact of the other contact-piece $m^7$ with the block $m^9$ will similarly close the electric circuit and bring into operation the other electromagnet and coöperating parts, when the other gear $k^3$ or $k^4$ will be brought into action to operate the shipper-operating screw, and the same rotated in an opposite direction, and so on, the bringing of one or the other of the contact-pieces $m^7$ $m^7$ into contact with the block $m^9$ and the carrying of it out of contact therewith similarly making and breaking the electric circuits, and through it bringing into and carrying out of operation the magnets and coöperating parts whereby the gears $k^3$ and $k^4$ are respectively brought into operation to actuate the shipper-operating screw $F^3$, as required. For controlling the movements of these contact-pieces $m^7$ $m^7$ from the trumpets $h$ and I, whereby to make and break the electric circuits therefrom, as the variations in the size and weight of the material passing through them may require the rotation of the shipper-operating screw $F^2$ in one or the other direction, or the arrest of such rotation, I provide the trumpet-supporting shaft H with two arms $m^{10}$ $m^{10}$, which extend outward over such contact-points $m^7$ $m^7$ at some distance above them, as shown. By this arrangement, when the trumpets are swung backward away from the rear drawing-rolls and calender-rolls, respectively, beyond a certain distance, in consequence of the material passing through the railway-head being below the standard size and weight, the upper of the arms $m^{10}$ will be brought into contact with the upper contact-piece $m^7$ and the same pressed into contact with the block $m^9$ thereby, closing the particular electric circuit in which that contact-piece is located and through the electromagnet in that circuit and the parts coöperating therewith causing the rotation of the shipper-operating screw in the proper direction to so move the belt on the cones E and E' as to restore the drawing delivered by the railway-head to its requisite size and weight. The drawing having been thus restored to its standard size and weight, the trumpets will be returned to their normal position by its action thereon supplemented by the counterbalancing action of the weight $h^4$, and the arm $m^{10}$ thereby carried out of contact with the contact-piece $m^7$, allowing such contact-piece to remove itself from contact with the block by its own resiliency, the result of which will be to break the electric circuit and allow the parts actuated from the electromagnet to return to their normal positions.

On the other hand, when the trumpets are vibrated in the opposite direction by the material passing through the railway-head being above the standard size and weight, the lower of the arms $m^{10}$ will be pressed upon the lower of the contact-pieces $m^7$, forcing it into contact with the block $m^9$, and thereby closing the electric circuit in which it is located, when the opposite magnet will be energized and the parts coöperating therewith brought into action to so rotate the shipper-operating screw as to cause a reduction in the size and weight of the drawing to the standard size and weight, after which the trumpets will be restored to their normal positions, the circuit broken, and the armature, lever, and gear returned to the positions they originally occupied ready for the next operation. The means for thus rotating the shipper-operating screw $F^3$ from the continuously-rotating shaft K being brought into operation only to correct the larger variations in the size and weight of the material passing through the railway-head, and its movements being controlled from the trumpet-supporting shaft H, which similarly controls the movements of the devices through which the rotation of the shipper-operating screw from the pawls $g^3$ $g^3$ is effected, it is obvious that the arms $m^{10}$ $m^{10}$ must be so arranged with respect to the contact-pieces $m^7$ $m^7$ that the contact between the latter and the block $m^9$ shall not be made until the vibrations of the trumpets exceed certain limits, the variations in the size and weight of the material passing through the railway-head causing vibrations of the trumpets within those limits being responded to through the intervention of the pawls $g^3$ $g^3$ and ratchet G. In order therefore to provide for accomplishing this, the arms $m^{10}$ $m^{10}$, instead of pressing directly upon the contact-pieces $m^7$ $m^7$ at all times, are disposed some distance above them whereby to allow of some considerable oscillation of the shaft H from the trumpets and otherwise without bringing them into contact therewith.

In some cases the block $m^9$ will be fixedly secured in place and the parts in contact, when the contact-pieces $m^7$ are pressed against it, will be stationary, as shown, for instance, in Fig. 1. I prefer, however, to have this contact a sliding one, as thereby the corrosion of the parts in contact, due to repeated sparkings, is obviated and the surfaces kept clean. For this purpose the block $m^{19}$, instead of being fixedly secured in place, is pivoted at its center to the main housings of the railway-head or other convenient part by a pivot $m^{20}$, and is vibrated back and forth from a cam-groove $m^{21}$ through the intermediaries of a lever $m^{22}$ and a connecting-rod $m^{23}$ $m^{24}$, the part $m^{23}$ of which is made of wood or other electricity-non-conducting material. (See Fig. 8.) The cam-groove $m^{21}$ may be made in any of the rotating parts that are conveniently located. I prefer, however, to construct it in the hub $f^{12}$ of the gear $f^2$, and it is so shown.

To the end that the lever $K^2$ may be returned to its normal position with the sleeve $k^6$, after having been deflected therefrom and the cause of the deflection removed, I provide the plungers $n$ $n$, which, mounted in suitable stands $n'$ $n'$ and arranged on opposite sides of the lever, are pressed forward against it by spiral springs $n^2$ $n^2$, that bear at one end against the stand and at the other end press against the collars $n^3$ $n^3$, secured upon such plungers.

The means for rotating the shipper-operating screw $F^3$ from the vertical shaft K, as before explained, being brought into operation only when the correction of the larger variations in the size and weight of the material is required, and the pawls $g^3$ $g^3$ and ratchet G being employed for correcting only the smaller variations therein, it is obvious that when the larger variations occur the pawls and the ratchet, as well as the devices operated from the vertical shaft K, would be brought into action to correct them and that breakage of parts would result if provisions were not made to obviate it. In order therefore to withdraw the pawls $g^3$ $g^3$ from action when the devices operated from the shaft K are brought into requisition, I provide each of such pawls with an inclined stud $s$, projecting upward from its upper side, and employ in connection with it a pawl-lifter $s'$, which is fixedly secured to the rear of the lever $K^2$, so as to vibrate with it, and, extending over the pawls, is provided with a groove $s^2$ in its under side, the walls of which are inclined outward from its bottom to its outer edge, as shown more clearly in Figs. 9 to 12. The depth of this groove is such that when the groove is brought over the studs $s$ $s$ it will not interfere with their operation, but allow them to engage with the teeth of the ratchet G when the shield $g^{12}$ is withdrawn from under them. When, on the other hand, the pawl-lifter $s'$ is carried across the studs $s$ $s$ by the vibration of the lever $K^2$, as it is moved in one or the other direction to clutch one or the other of the gears $k^3$ or $k^4$ to the shipper-operating screw $F^3$, then the inclined walls of the groove will be carried across said studs and the portion of the lifter on one or the other side of the groove brought over them, the result of which will be to raise the pawls from the shield $g^{12}$ and hold them inoperative in that position, as is shown in Figs. 11 and 12, until the lever $K^2$ is returned to its normal position and the gear $k^3$ or $k^4$, as the case may be, is unclutched from the shipper-operating screw $F^3$, when, by such return movement, the lifter will be carried back into its normal position, the groove $s^2$ brought over the studs, and the pawls $g^3$ $g^3$ thereby again returned into operation, and so on, the pawls $g^3$ $g^3$ being carried out of action when the devices for actuating the shipper-operating screw $F^3$ from the vertical shaft K are brought into requisition and such pawls returned into action when these devices are carried out of operation.

M indicates the shipper-rod, by means of which the shipping of the driving-belt N from the loose pulley $a^2$ to the fast pulley $a'$, and vice versa, is accomplished, to respectively start and stop the movements of the railway-head. This rod is arranged to slide in a suitable bearing $o$, formed in the main housings of the railway-head and, provided at one of its ends with the usual shipper-fork $o'$ for engaging with the belt, is preferably reciprocated back and forth to effect the shipping operation from the shaft M', which, extending upward through the table of the railway-head and provided at its upper end with suitable handles $o^2$ $o^2$, is equipped at its lower end with an arm $o^3$, which, fixedly secured thereto, is pivoted at its free end to the rod M by a pivot $o^4$, projecting upward from the collar $o^5$, fast thereon. With the shipper as thus arranged I sometimes find it convenient to employ means whereby the automatic shipping of the driving-belt from the fast to the loose pulley, and the consequent stopping of the railway-head, may be effected when the shipper F' for the belt F has been moved by the shipper-operating screw $F^3$ to a position near either of the ends of the latter without in any way interfering with the starting or stopping of the railway-head from the shipper-operating shaft M'. The means made use of for this purpose may be of various forms. In my preferred form of construction, however, I make use of a tube $M^2$, which, receiving and guiding the end of the shipper-rod M and adapted to be moved in one direction by the collar $o^5$ to lock it in an operative position, is loosely mounted in suitable bearings formed in the projecting portions $o^6$ and $o^7$ of the stand or hanger $M^3$, and is adapted to be moved in the opposite direction, when unlocked, by a spiral spring $o^8$, which, surrounding it, bears at one end against the portion $o^7$ of the stand or hanger $M^3$, and at its other end presses against the collar $o^9$, secured to such tube. For locking the tube $M^2$ in operative position when carried into it I make use of the latch $o^{10}$, which, pivoted at one of its ends thereto, is provided at the opposite end with a hook $o^{11}$ for engagement with a lug $o^{12}$, projecting from the stand or hanger $M^3$. With the parts arranged as thus described, when the shipper-rod M is moved to ship the belt N from the loose pulley $a^2$ to the fast pulley $a'$, the collar $o^5$ thereon will abut against the end of the tube $M^2$, and, carrying it forward with it in its bearings in the projecting portions $o^6$ and $o^7$ of the stand or hanger $M^3$, will compress the spiral spring $o^8$ until the belt is completely shipped from the loose to the fast pulley, when the hook $o^{11}$ on the latch $o^{10}$ will drop over the lug $o^{12}$ on such stand or hanger, and the tube $M^2$ thereby locked in an operative position. The tube $M^2$ being thus locked in this position will be there held until the hook $o^{11}$ on the latch $o^{10}$ is released from the lug $o^{12}$, and the shipper-rod M will be left free to be operated to ship the belt from the loose to the fast pulley, or from the fast to the loose pulley, as may be desired. When, however, the belt N is on the fast pulley $a'$ and the tube is locked in its operative position, the shipping of the belt from the fast to the loose pulley to arrest the movements of the railway-head may be effected by simply raising the hook $o^{11}$ of the latch $o^{10}$ from engagement with the projection $o^{12}$, when the resiliency of the spring $o^8$, then under compression, will force the tube $M^2$ toward the collar $o^5$, and, abutting against it, will, through it and the rod M, ship the belt from the fast to the loose pulley.

In order therefore to effect the automatic stopping of the railway-head from the shipper F' when the tube $M^2$ is locked in an operative position, as will always be the case with such tube when the belt N is on the fast pulley $a'$, the guiding-rod $F^2$, which is loosely mounted in suitable bearings in the main housings of the railway-head, is provided with collars $p\ p$, fixedly secured thereto and connected at one of its ends with the free end of an arm $p'$, which in turn is fixedly secured to the front end of a shaft $p^2$, that is provided at its other end, under the latch $o^{10}$, with two oppositely-disposed tappets $p^3\ p^3$. As thus arranged, whenever the railway-head is in operation, and the shipper F' in its travel is brought into contact with one or the other of the collars $p\ p$, the shaft $p^2$, through the guiding-rod $F^2$ and arm $p'$, will be oscillated around its axis in a corresponding direction, the hook $o^{11}$ disengaged from the lug $o^{12}$ by the upward swinging movement of the appropriate tappet $p^3$ against the latch $o^{10}$, and the shipping of the belt from the fast pulley $a'$ to the loose pulley $a^2$, and the consequent stopping of the railway-head thereby effected.

To return the shield $g^{12}$ and the parts connected therewith to their normal positions, and thereby render the pawls $g^3\ g^3$ inoperative when the stopping of the railway-head is effected by a movement of the guiding-rod $F^2$, I make use of the lever O, which, pivoted to a suitable support by a pivot $q$, is provided at one end with a fork $q'$ for straddling the pin $h^2$ and engages at the other end with a slot $q^2$, formed in a plate P, that is fixedly secured to the guiding-rod $F^2$ and movable back and forth therewith in a guideway $q^3$, formed in the stand $q^4$. The form of the slot $q^2$, which engages with the end of the lever O, is that of an incline, with a short section of its middle portion and its ends disposed in horizontal planes, as clearly shown in Figs. 1 and 3.

In order to insure the unclutching of the gears $k^3$ and $k^4$ from the shipper-operating screw $F^3$, when one or the other of these gears are clutched thereto, and the return of the lever $K^2$ to its normal position when the guiding-rod $F^2$ is moved by the contact of the shipper F with one or the other of the collars $p\ p$ thereon, in the event of the failure of the contact-pieces $m^7\ m^7$ to break the electric circuit, or the springs $n^2\ n^2$ to effect those results, I provide the plate P with a stud $r$, which engages with suitable lugs $r'\ r'$, formed on the end of a projection extending outward from the lever $K^2$ and, through such engagement, forces the lever back into its normal position, and thereby unclutches the gear $k^3$ or $k^4$ from the shipper-operating screw $F^3$.

For returning the guiding-rod $F^2$, the shaft $p^2$, the plate P, and the lever O to their normal positions after having been moved therefrom by the contact of the shipper F' with one or the other of the collars $p\ p$ and such shipper has been removed from it, I find it convenient to make use of the plate R, which, mounted upon the tube $M^2$, between the end of the spiral spring $o^8$ and the projecting portion $o^7$ of the stand or hanger $M^3$, engages, by its overturned ends, with the arms $t\ t$, secured to the shaft $p^2$, one of which projects above and the other below the stand or hanger $M^2$, as shown.

With a view to obviating the loss of the electric energy when the railway-head is not in operation I interpose in one of the conducting-wires—$m^8$, for instance—a circuit making and breaking device. As shown in the drawings, Figs. 1 and 3, this device consists of two metal plates $u\ u$, to each of which one of the adjoining ends of the wire is attached. In their normal position, as when the railway-head is not in operation, these plates will be held separated by their own resiliency, and the current thereby prevented from entering the circuit along this wire beyond the upper end of the plate to which the lower section of such wire is secured. When, on the other hand, the driving-belt N is shipped from the loose pulley $a^2$ to the fast pulley $a'$, then these plates are forced into contact by a projection $v$ on the lever $v'$, which lever, pivoted at its outer end to the housings of the railway-head by a pivot $v^2$, is swung forward toward and the projection $v$ thereby pressed against the plate to which the upper section of the said wire $m^8$ is attached by the shipper-rod M through the intermediary of the arm $v^3$, as best shown in Fig. 3.

It will thus be seen that I produce a railway-head which is adapted to the evening of the larger and smaller variations in the size and weight of the material passing through it with equal facility, and which, by reason thereof and of the location of devices in front as well as in rear of the drawing-rolls, upon which such variations act to set in operation the evener mechanism to correct them, insures the production of a more uniform drawing than has been possible with the railway-heads heretofore in use.

Although in the foregoing I have described the best means contemplated by me for carrying my invention into practice, I wish it distinctly understood that I do not limit myself strictly thereto, as it is obvious that I may modify the same in various ways without departing from the spirit thereof. Again, while I have shown and described my invention as applied to "railway-heads," so called, it is manifest that it may be employed, either in whole or in part, in connection with drawing-frames and other forms of machinery made use of to effect the transformation of cotton fiber into yarn, and I intend so to apply it.

Having now described my invention and specified certain of the ways in which it is or may be carried into effect, I claim—

1. The combination, with the drawing-rolls, and an evener mechanism, of devices for operating said evener mechanism to correct the smaller variations in the size and weight of the material passing between the drawing-rolls, and additional devices for operating such evener mechanism to correct the larger variations therein, substantially as described.

2. The combination, with the drawing-rolls, and an evener mechanism, of devices for operating this evener mechanism to correct the smaller variations in the size and weight of the material passing between the drawing-rolls, additional devices for operating such evener mechanism to correct the larger variations therein, and appliances upon which the variations in the size and weight of the material operate to set in motion both of the evener-mechanism-operating devices, substantially as described.

3. The combination, with the drawing-rolls, and an evener mechanism, of devices for operating such evener mechanism to correct the smaller variations in the size and weight of the material passing between the drawing-rolls, additional devices for operating said evener mechanism to correct the larger variations therein, a trumpet located in front of said drawing-rolls, upon which the variations in the size and weight of the material operate to set in operation both of the evener-mechanism-operating devices, and intermediate connecting mechanism between such trumpet and said devices, substantially as described.

4. The combination, with the drawing and calender rolls, and the evener mechanism, of devices for operating this evener mechanism to correct the smaller variations in the size and weight of the material passing between such drawing and calender rolls, additional devices for operating said evener mechanism to correct the larger variations therein, a trumpet arranged in front, and a trumpet arranged in rear, of the drawing-rolls, upon which variations in the size and weight of the material operate to set in operation both of the evener-mechanism-operating devices, and intermediate connecting mechanism between such trumpet and said devices, substantially as described.

5. The combination, with the drawing-rolls, the calender-rolls, and the evener mechanism, of devices for operating the evener mechanism to correct the smaller variations in the size and weight of the material passing between such drawing and calender rolls, additional devices for operating said evener mechanism to correct the larger variations therein, a trumpet located in front, and a trumpet located in rear, of the drawing-rolls, upon which variations in the size and weight of the material operate to set in operation both of the evener-mechanism-operating devices, and intermediate connecting mechanism between the two trumpets and between the trumpet arranged in rear of the drawing-rolls and such evener-mechanism-operating devices, substantially as described.

6. The combination, with the drawing and the calender rolls, an evener mechanism, and devices for operating such evener mechanism to correct the variations in the size and weight of the material passing between said rolls, of an electromagnet and armature by means of which the evener-mechanism-operating devices may be brought into operation when the electromagnet is energized, devices upon which the variations in the size and weight of the material passing between such rolls operate to effect the energizing of said electromagnets, and intermediate connecting mechanism between the parts, substantially as described.

7. The combination, with the drawing and calender rolls, an evener mechanism, a trumpet arranged in rear of the drawing-rolls, a shaft upon which such trumpet is supported, and devices for operating such evener mechanism to correct variations in the size and weight of the material passing between said rolls, of an electromagnet and armature by means of which such evener-mechanism-operating devices are brought into operation when the electromagnet is energized, an electric circuit under the control of the trumpet-supporting shaft whereby the energizing of said magnet is effected, and intermediate connecting mechanism between the electromagnet and the evener-mechanism-operating devices, substantially as described.

8. The combination, with the drawing-rolls, a trumpet arranged in front of such drawing-rolls, and a trumpet arranged in rear thereof, of devices whereby these two trumpets may be connected and caused to move in unison and the front trumpet disconnected from the rear trumpet when desired, substantially as described.

9. The combination, with the drawing-rolls, a trumpet, a shaft, H, with which the trumpet is connected, a pair of reversely-arranged cones, E E', the latter of which is connected with the front pair of drawing-rolls, a belt for such cones, a shipper for said belt, and a shipper-operating screw provided with reversely-arranged bevel-gears, of a continuously-rotating shaft provided with a bevel-gear at its end, a pair of electromagnets, an armature for coöperating with such magnets, electric circuits, circuit making and breaking devices under the control of the shaft H, through which either one or the other of the electromagnets may be brought into or carried out of operation as such shaft is oscillated in one or the other direction, and a lever connected with the armature and coöperating with the gears on the shipper-operating screw and on the continuously-rotating shaft, whereby, upon the oscillation of the shaft H in one or the other direction, one or the other of the electromagnets will be brought into operation, and, through the armature and lever connected therewith, the gear on the continuously-rotating shaft will be brought into operative connection with the shipper-operating screw, to rotate it in one or the other direction and thereby ship the belt along the cones, substantially as described.

10. The combination, with the shipper-operating screw $F^3$ provided with the reversely-arranged bevel-gears $k^3$ and $k^4$ loosely mounted thereon and equipped with clutch members on their inner faces, a sleeve, $k^6$ loosely mounted upon, but splined to said shaft and provided with clutch members $k^5$ at each of its ends, a lever, $K^2$, for engaging with such sleeve, a pair of electromagnets, L L, an armature, L', conducting-wires, $m^5$ $m^6$ and $m^8$, contact-pieces, $m^7$ $m^7$, block, $m^9$, shaft, H, provided with arms, $m^{10}$ $m^{10}$, and a trumpet connected with said shaft, substantially as described.

11. The combination, with electromagnets, L L, an armature, L', for coöperating therewith, a lever, $K^2$, to which the armature is connected, plungers, $n$ $n$, for acting upon said lever, provided with collars $n^3$ $n^3$, stands, $n'$ $n'$, in which the plungers are fitted to move, and springs, $n^2$ $n^2$, for forcing the plungers toward the aforementioned lever, of a shaft, H, provided with arms, $m^{10}$ $m^{10}$, a trumpet, contact-pieces, $m^7$ $m^7$, and a block, $m^9$, arranged in operative relationship to the contact-pieces, and conductors, $m^5$ $m^6$ and $m^8$, the two former of which lead through the electromagnets and are connected with the said contact-pieces, and the latter is connected with the block $m^9$, substantially as described.

12. The combination, with the pawls $g^3$ $g^3$ provided with studs $s$ $s$, and the lever $K^2$, of the pawl-lifter $s'$, fixedly secured to the lever $K^2$ and provided with the groove $s^2$, and means for vibrating said lever back and forth whereby to remove such pawls from, or return them into, operation when required, substantially as described.

13. The combination, with the shipper-operating screw $F^3$ provided with the reversely-arranged bevel-gears $k^3$ $k^4$ loosely mounted thereon and provided with clutch members on their faces, the sleeve $k^6$ constructed with clutch members on each of its ends, and the continuously-rotating shaft K provided with the bevel-gear $k^2$, of the lever $K^2$ engaging such sleeve at one of its ends, the ratchet G, pawls $g^3$ $g^3$ provided with the studs $s$ $s$, the pawl-lifter $s'$ constructed with the groove $s^2$, and means for imparting a vibratory movement to said lever whereby, when the sleeve is clutched to either of the gears $k^3$ or $k^4$, the pawls $g^3$ $g^3$ will be carried out of operation, and when such sleeve is unclutched therefrom they will be returned into operation, substantially as described.

14. The combination, with the front and rear drawing-rolls, an evener mechanism shipper-operating screw, and a device controlled in its movement by the variations in the size and weight of the material passing through such drawing-rolls for causing the rotation of such screw in one or the other direction as the evening of such material may require, of counterbalancing appliances for said devices, mechanism intermediate these appliances and the evener mechanism whereby the adjustment of such appliances to cause them to counterbalance the deflective action brought to bear upon the said device is effected from the evener mechanism, a pair of reversely-arranged cones of variable tapers, a belt for such cones, and a shipper, substantially as described.

15. The combination, with a shaft, H, provided with an arm, $h^3$, the weight $h^4$ supported thereon, a trumpet connected with such shaft, an evener mechanism shipper-operating screw, $F^3$, and mechanism under the control of said shaft for rotating said screw in one or the other direction, of mechanism for moving the weight $h^4$ along the arm $h^3$, from the screw $F^3$, to counterbalance the deflective force brought to bear upon the trumpet by variations in the size and weight of the material passing through it, cones E and E' constructed with a variable taper, belt F for connecting such cones, and a shipper, F', substantially as described.

16. The combination, with a trumpet provided with arms $i'$ $i'$ and with a movable under jaw, of arms, $i^5$ $i^5$, secured to the said movable jaw, rods, $i^{13}\ i^{13}$, connected at one end to said last-mentioned arms, and springs supported by these rods for holding the movable jaw normally pressed upward toward the upper jaw, substantially as described.

17. The combination, with a trumpet, I, provided with arms, $i'\ i'$, and with a movable under jaw, of arms, $i^5\ i^5$, depending from said under jaw, rods, $i^{13}\ i^{13}$, connected at one of their ends to said last-mentioned arms, springs, $i^3\ i^3$, supported by such rods and serving to hold the movable jaw normally pressed toward the upper jaw, a shaft, I', upon which the trumpet is mounted, an arm, $i^7$, secured to said shaft, a latch, $i^9$, pivoted in the arm $i^7$, and a rod, $i^{10}$, supported by the arms $i^5\ i^5$, with which the said latch may be engaged, substantially as described.

18. The combination, with a trumpet provided with arms $i'\ i'$ and with a movable jaw having connected arms $i^5\ i^5$, and the girth $i^4$ extending across between the arms $i'\ i'$, of the rods $i^{13}\ i^{13}$, connected at one of their ends to the arms $i^5\ i^5$, springs, $i^3\ i^3$, supported upon said rods and serving to hold the movable jaw pressed toward the other jaw, a bar, $i^{12}$, through which the rods $i^{10}\ i^{10}$ are passed, and a cam-lever operating in connection with such bar whereby to withdraw the movable jaw of the trumpet from the other jaw when required, substantially as described.

19. The combination, with the shipper-rod M, provided with the collar $o^5$, and mechanism by means of which the reciprocation of such rod in one or the other direction is accomplished, of the tube $M^2$, in which the shipper-rod slides, provided with a collar, $o^9$, a spring, $o^8$, for moving said tube in one direction, a hanger, $M^3$, in which such tube is supported, a lug, $o^{12}$, projecting from said hanger, and a latch $o^{10}$, pivoted upon the tube $M^2$ and provided with a hook for engagement with said lug, substantially as described.

20. The combination, with the latch $o^{10}$, the shipper-operating screw $F^3$, and the shipper F' mounted upon such screw, of the guiding-rod $F^2$, for guiding said shipper, provided with collars, $p\ p$, the shaft $p^2$, provided with the arm $p'$ for engagement with the guiding-rod $F^2$, and with the oppositely-arranged tappets $p^3\ p^3$ for coöperation with the latch $o^{10}$, substantially as described.

21. The combination, with the shipper-operating screw $F^3$, the shield $g^{12}$, and the lever $K^2$ constructed with the projections $r'\ r'$, of the shipper F', operated by said shipper-operating screw, guiding-rod $F^2$, for guiding said shipper as it is moved back and forth along such screw, provided with collars, $p\ p$, the plate P, connected with the said guiding-rod and provided with a cam, a pin, $h^2$, projecting from the shield $g^{12}$, and a lever, O, engaging at one end with the cam carried by the plate P, and at the other end engaging with the pin on the shield $g^{12}$, substantially as described.

22. The combination, with the tube $M^2$, spring $o^8$, for moving such tube in one direction, and the plate R, mounted upon said tube, of the rod $F^2$, the shaft $p^2$ provided with arms, $t\ t$, for engagement with the plate R, and with an arm $p'$, engaging with the rod $F^2$, the lever $K^2$, provided with lugs, $r'\ r'$, the lever O, and the plate P, provided with a stud, $r$, for engagement with the lugs $r'\ r'$ on the lever $K^2$, and with a cam-slot, $q^2$, for engaging with the lever O, substantially as described.

23. The combination, with the wire $m^8$, and the contact-pieces $u\ u$, of the shipper-rod M, provided with the arm $v^3$, the lever $v'$ operated from such arm and provided with a projection $v$ for pressing the contact-pieces together when brought into engagement therewith by the movement of the said shipper-rod, substantially as described.

24. The combination, with a trumpet provided with a movable jaw, and a coöperating jaw, of means for adjusting such movable jaw toward and away from the coöperating jaw, to enlarge or diminish the opening in the smaller end of the trumpet, and appliances for withdrawing the movable jaw from the coöperating jaw, when required, and positively locking it in such withdrawn position, substantially as described.

25. The combination, with a trumpet, I, provided with supporting-arms, $i'\ i'$, and with a movable jaw, $i$, which is likewise provided with arms, $i^5\ i^5$, and the rods $i^{13}\ i^{13}$, connected at one of their ends to the arms $i^5\ i^5$, with their other ends extended through apertures in the arms $i'\ i'$, of springs supported by said rods and serving to normally hold the movable jaw pressed toward its coöperating jaws, and adjusting-nuts, $i^{14}\ i^{14}$, applied to said rods, substantially as described.

In testimony whereof I have hereunto set my hand this 19th day of August, 1895.

ARTHUR W. MATHEWSON.

Witnesses:
GEORGE W. BELT,
J. W. GOFF.